April 7, 1942.  A. PACKCHANIAN  2,279,012
SUPPORTING AND HOLDING DEVICE FOR ANIMALS
Filed July 22, 1941  3 Sheets-Sheet 1
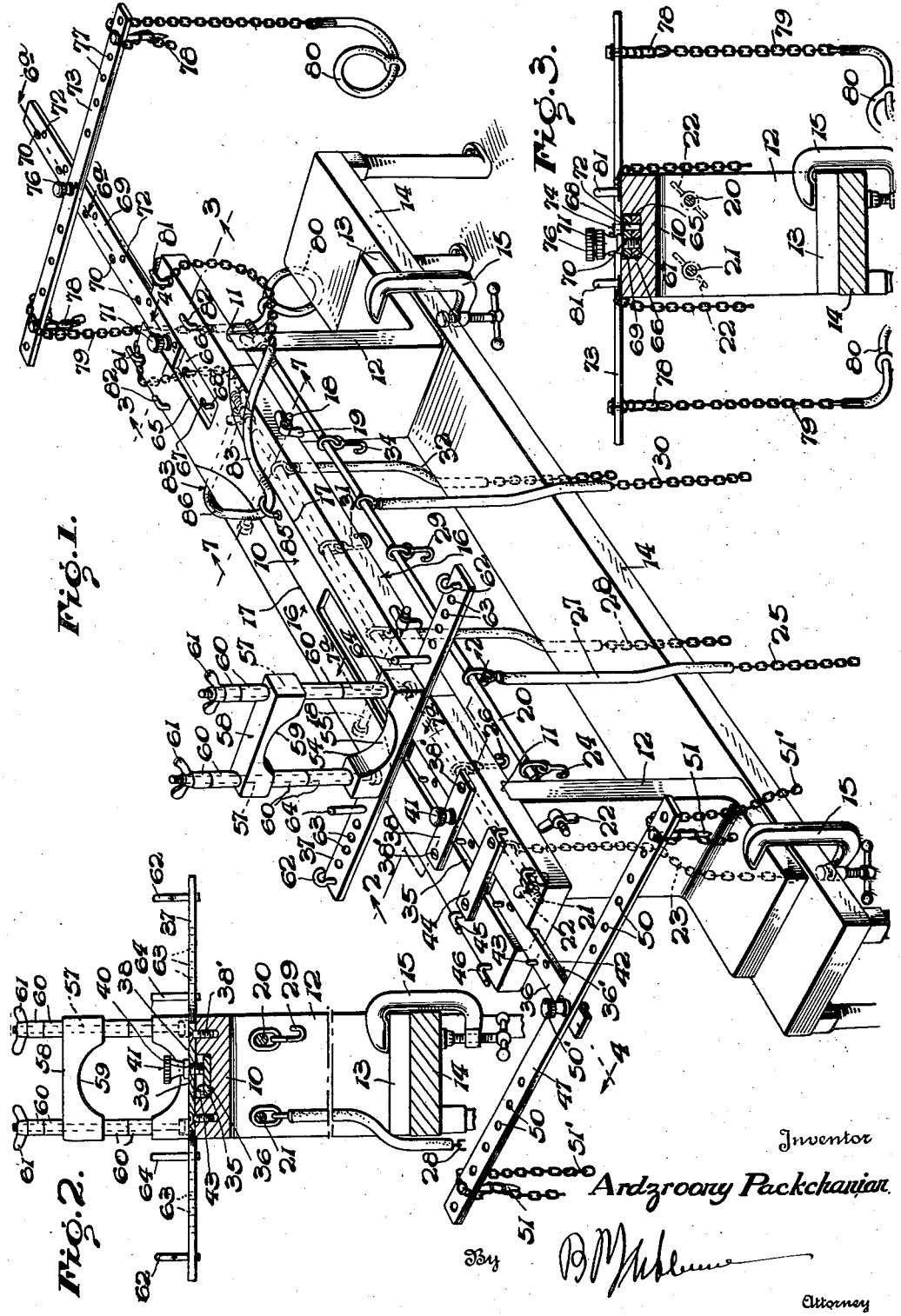
Inventor
Ardzroony Packchanian
By
Attorney April 7, 1942.  A. PACKCHANIAN  2,279,012
SUPPORTING AND HOLDING DEVICE FOR ANIMALS
Filed July 22, 1941  3 Sheets-Sheet 2
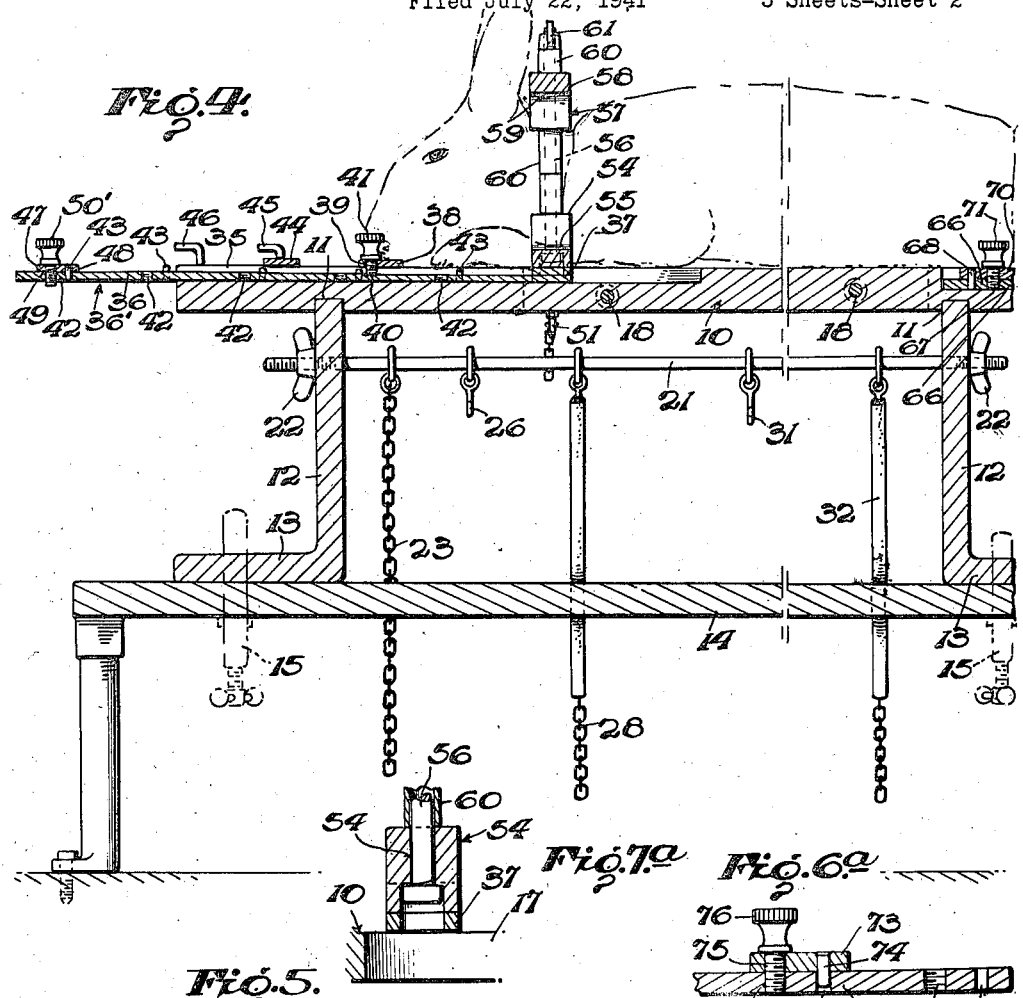
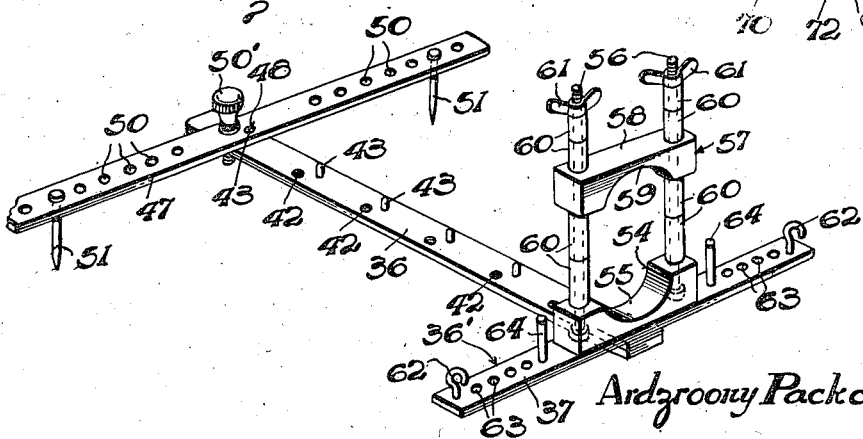
Inventor
Ardzroony Packchanian April 7, 1942.  A. PACKCHANIAN  2,279,012

SUPPORTING AND HOLDING DEVICE FOR ANIMALS

Filed July 22, 1941   3 Sheets-Sheet 3

Inventor
Ardzroony Packchanian
By
Attorney

Patented Apr. 7, 1942

2,279,012

UNITED STATES PATENT OFFICE 2,279,012

SUPPORTING AND HOLDING DEVICE FOR ANIMALS

Ardzroony Packchanian, Washington, D. C.

Application July 22, 1941, Serial No. 403,581

13 Claims. (Cl. 119—103)

My invention is a supporting and holding device for animals.

An important object of the invention is to provide a supporting and holding device adapted for use in connection with laboratory animals, such as monkeys, rabbits, guinea pigs or the like.

A further object of the invention is to provide a device of the above mentioned character which is readily adjustable within limits, for accommodating animals of different sizes.

A further object of the invention is to provide a device of the above mentioned character, so constructed that the animal may be properly mounted and held thereon, by a single operator.

A further object of the invention is to provide a device of the above mentioned character which will hold the animal in various positions, depending upon the character of the work to be done upon the animals.

A further object of the invention is to provide a device of the above mentioned character which will properly hold the animal with a minimum discomfort to the animal.

Other objects and advantages of the invention will be apparent during the course of the following description.

In the accompanying drawings forming a part of this application and in which like numerals are employed to designate like parts throughout the same;

Figure 1 is a perspective view of apparatus embody my invention,

Figure 2 is a transverse section taken on line 2—2 of Figure 1,

Figure 3 is a similar view taken on line 3—3 of Figure 1.

Figure 4 is a longitudinal section taken on line 4—4 of Figure 1,

Figure 5 is a perspective view of the neck yoke removed,

Figure 6:
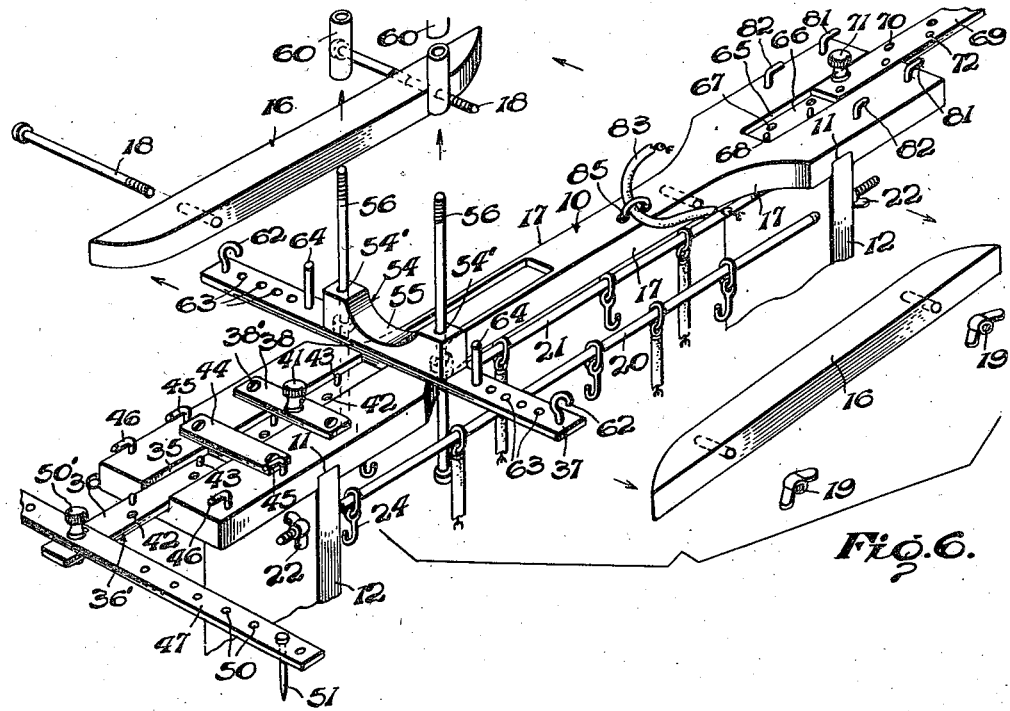
Figure 6 is an exploded perspective view of the apparatus.
Figure 7:
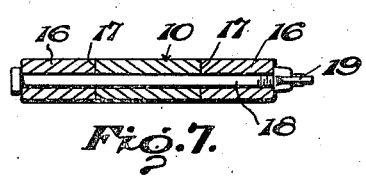
Figure 8:
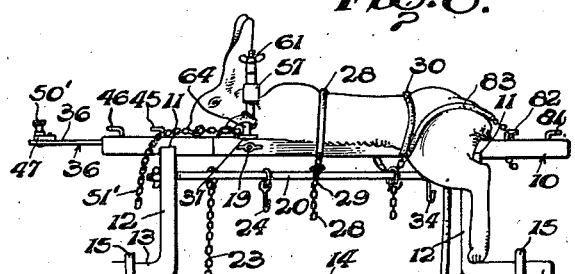
Figure 9:
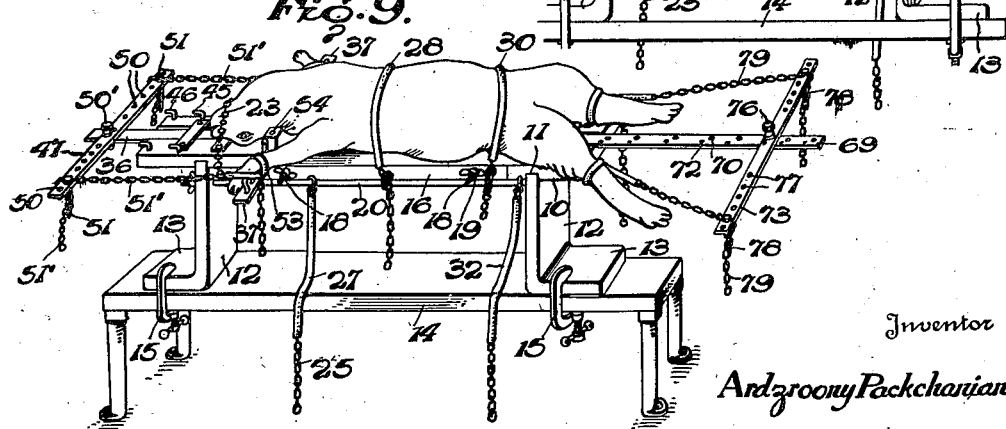

Figure 6ª is a detailed section taken on line 6ª—6ª of Figure 1,

Figure 7 is a transverse section taken on line 7—7 of Figure 1,

Figure 7ª is a similar view taken on line 7ª—7ª of Figure 1,

Figure 8 is a side elevation of the apparatus, showing an animal applied thereto with the dorsal side up, and, Figure 9 is a perspective view of the apparatus, showing an animal applied thereto with the dorsal side down, a portion of the yoke removed, and the legs spread and stretched.

In the drawings, wherein for the purpose of illustration is shown a preferred embodiment of my invention, the numeral 10 designates the body portion of the device, preferably in the form of a flat board. This body portion or board is provided near its opposite ends and upon its lower side with transverse grooves 11, within which are rigidly secured by any suitable means. the upper ends of legs 12, provided at their lower ends with feet 13, adapted to be detachably rigidly secured to a support, such as a table 14, by means of clamps 15 or the like.

The intermediate portion of the body portion or board 10, between the legs 12, is provided with removable filler-strips 16, fitting within edge recesses 17, and detachably secured to the body portion by transverse bolts 18, having winged nuts 19. When the body portion or board is used to support larger animals, such as monkeys or the like, the filler-strips 16 remain in place upon the body portion or board, so that the same has a uniform width, but when the device is employed to support smaller animals, such as guinea pigs or the like, the filler-strips 16 are removed, to render that portion of the body portion or board which engages with the body of the animal considerably narrower, enabling the legs of the animal to conveniently extend over the side edges of the body portion or board, thereby promoting the comfort of the animal, as much as possible.

Arranged beneath the body portion or board 10 and near its opposite longitudinal edges are longitudinal extending rods 20 and 21, passing through openings formed in the legs 12, and having their ends screw-threaded for receiving winged nuts 22. These rods carry various flexible holding elements, and connecting means therefor. Near its forward end, the rod 21 carries a chain 23, slidable upon this rod, and adapted to detachably engage with a coacting hook 24, upon the companion rod 20. A chain 25 is slidably mounted upon the rod 20 and is adapted to detachably engage with a coacting hook 26, carried by the rod 21. That portion of the chain 25 which is adapted to be passed over and engage with the body of the animal is preferably covered with rubber tubing 27. A similar chain 28 is slidably mounted upon the rod 21 and is adapted for detachable engagement with a hook 29, slidable upon the rod 20. A similar chain 30 is slidably mounted upon the rod 20 for detachable engagement with a hook 31 upon the rod 21 and a similar chain 32 is slidably mounted upon the rod 21 for detachable engagement with a hook 34, slidable upon the rod 20.

The body portion or board 10 is provided in its forward portion with a longitudinally extending groove 35, for slidably receiving the longitudinal arm 36 of a T-shaped carriage or slide 36', including a transverse arm 37, arranged above and rigidly secured to the longitudinal arm 36 by welding or the like. The T-shaped carriage or slide is longitudinally adjustable upon the body portion or board 10. A transverse bridge-strip 38 is provided, rigidly attached to the forward portion of the board or body portion 10 by screws 38' or the like and this bridge-strip extends across the groove 35. This bridge strip has a screw-threaded opening 39, Figure 4, for receiving a set screw 40, having a milled head 41. This set screw is adapted to contact with the upper face of the longitudinal arm 36 and clamp the arm in the selected adjusted longitudinal position. The longitudinal arm 36 is provided near one longitudinal edge with a series of spaced screw-threaded openings 42 and near its opposite longitudinal edge with a series of spaced upstanding pins 43, rigidly attached thereto. A second bridge-strip 44 also extending over the groove 35, and is rigidly attached to the board 10 by any suitable means, and forwardly facing hooks 45 are secured to the board 10, at the ends of the bridge-strip 44. The bridge-strip 44 may be omitted if desired. Forwardly facing hooks 46 are secured to the board 10 at its forward end, as shown.

The numeral 47 designates a transverse bar for stretching the front legs of the animal. This bar extends over the forward end of the longitudinal arm 36 and has a small opening 48, Figure 4, to receive a selected pin 43, and a larger screw-threaded opening 49, to receive a set screw 50', also adapted to engage within a selected screw-threaded opening 42. The transverse bar 47 is therefore adapted to be adjusted longitudinally of the arm 36 and to be clamped thereto in the selected adjusted position. The bar 47 is provided with spaced openings 50, to receive nails 51 or the like, which serve to attach chains 51' to this bar. These chains are provided at their free ends with loops 53 to receive the front legs of the animal.

The animal head holder or yoke comprises a lower member or jaw 54, rigidly secured to the transverse arm 37 by any suitable means, and having a curved recess 55. The lower jaw 54 is provided with vertical openings 54', to receive vertical rods 56, which also pass through openings in the transverse arm 37. The rods are provided at their lower ends with heads. The vertical rods 56 are removable from the lower jaw 54 and transverse arm 37, in a manner to be further explained. The vertical rods 56 extend above the lower jaw 54 and pass through openings 57 in an upper jaw 58, provided with a curved recess 59. Spacing sleeves 60 are preferably arranged above and below the upper jaw 58. The rods 56 are threaded to receive winged nuts 61. By screwing up the winged nuts, the upper jaw is clamped against the lower spacing sleeves 60, which define the desired minimum distance between the jaws 58 and 54, above and below the neck of the animal. The passage between these jaws is properly determined so that the animal cannot pull its head through the jaws, but the jaws do not have clamping engagement with the neck of the animal, thus promoting the comfort of the animal.

The transverse arm 37 is provided at its ends with rearwardly facing hooks 62, and this transverse arm is provided near its ends with sets of spaced openings 63, preferably slightly tapered, to receive removable vertical leg holding pins 64. In some instances, the front legs of the animal are arranged between the pins 64 and the lower jaw 54.

When the filler-strips 16 are removed and the T-shaped carriage or slide 36' is properly adjusted to bring the heads 56' of the bolts at or within the recesses 17, by removing the winged nuts 61 from the bolts, the bolts may be moved downwardly and separated from the lower jaw 54 and transverse arm 37. The slide or carriage 36' may then be used without the vertical rods and upper jaw, as shown in Figure 9.

The body portion or board 10 is provided at its rear end with a longitudinal groove 65, within which is mounted a metal plate 66, rigidly attached to the board 10 by any suitable means. This metal plate has a longitudinally extending set of spaced screw-threaded openings 67 and a longitudinal set of spaced vertical pins 68, rigidly secured thereto. Longitudinally adjustably mounted within the groove 65, above the plate 66, is an arm or bar 69, having a longitudinal set of screw-threaded openings 70, to receive a set screw 71, adapted to engage within a selected screw-threaded opening 67, and the selected pin 68 will enter a selected adjacent small opening 72. A transverse bar 73 is provided for spreading and stretching the rear legs of the animal, and this bar has a small pin 74 to enter a selected opening 72, and a large screw-threaded opening 75, to receive a set screw 76, to engage within a selected screw-threaded opening 70. The bar 73 is provided upon opposite sides of the bar 69 with sets of spaced openings 77, receiving nails 78, serving to secure chains 79 to the bar 73. These chains have sliding loops 80 at their rear ends to hold the rear legs of the animal. Rearwardly facing hooks 81 and 82 are secured to the rear portion of the board 10.

The numeral 83 designates a pair of chains, attached to the board 10, at 85, at the central longitudinal axis of the board 10, and between the legs 12. The portions of the chains 83 which engage the body portion of the animal are preferably covered with rubber tubing 86, as shown. The chains 83 are arranged to hold the animal's hip and pelvis on the board and are secured to hooks 81 or 82.

Figure 8 illustrates one use of the apparatus. In this figure a rabbit is shown with his dorsal side up. The body portion of the rabbit is held within the chains 28 and 30, the opposite ends of which are attached to the rods 20 and 21. The various chains carried by these rods are longitudinally adjustable upon the rods, and some or all of the chains may be employed, as is found advantageous in the particular case. The hind legs of the rabbit hang down below the support 10, while its front legs are arranged upon the upper surface of the body portion 10, inwardly of the pins 64. These front legs are held by the chains 51' attached to the hooks 45. The neck of the rabbit is held within the yoke. The chains 83 pass over the hips of the rabbit and are attached to the hooks 82. The arm 69 and the elements carried thereby may be removed.

The device may also be used for holding larger animals, such as monkeys, with the dorsal side down. The straps or chains 25, 28, 30 and 32 are employed to hold the body of the animal in place. The rear legs would extend near or beyond the end of the body portion 10 and be secured to the chains 79. The yoke would receive and hold the neck of the monkey, while the arms would be arranged outwardly of the pins 64, or these pins may be removed, and the chains 51' are connected with the arms near the hands and are passed through the hooks 62 and then attached to the hooks 45. The chains 51' may also be attached to the transverse bar 47 instead of to the hooks 45. The bar 47 would be used instead of the hooks 45 in the event that the arms of the animal are long. The chains 83 are passed upwardly over the hips and pelvis and are connected with the hooks 81 or 82. Small animals may also be held upon the device with the dorsal side down. Figure 1 shows one form of the invention for holding animals of various sizes.

Figure 9 illustrates the apparatus used with the upper jaw 58 and rods 56 removed. The animal is arranged upon the body portion with the dorsal side down. The body of the animal is held in place by the chains 28 and 30. The neck of the animal is arranged within the recess 55 of the lower jaw 54 and the head of the animal is held down by the chain 23. The front legs of the animal are arranged outwardly of the pins 64 and are connected with the chains 51', engaging in the hooks 62 and these chains are connected with the transverse bar 47. The chains hold the front legs spread and stretched. The rear legs are connected with the chains 79, in turn connected with the bar 73, whereby the rear legs are held spread and stretched. In some instances, the rods 56 may remain in place when the upper jaw 58 is removed.

It is to be understood that the form of my invention herewith shown and described is to be taken as a preferred example of the same and that various changes in the shape, size, and arrangement of parts may be resorted to without departing from the spirit of my invention or the scope of the subjoined claims.

Having thus described my invention, what I claim is:

1. In apparatus of the character described, a body portion to receive the animal thereon, flexible elements secured to the body portion to extend longitudinally thereof and adapted to be passed over the hips and pelvis of the animal, means for attaching the ends of the flexible elements to the body portion, a yoke for receiving the neck of the animal and mounted upon the body portion, flexible elements connected with the body portion and adapted to extend transversely of the body of the animal, a longitudinal arm mounted upon the body portion and extending beyond the rear end thereof, a transverse arm carried by the longitudinal arm, flexible elements secured to the transverse arm and adapted to be attached to the rear legs of the animal, a second longitudinal arm mounted upon the body portion and extending longitudinally thereof beyond its forward end, a transverse arm carried by the second longitudinal arm, and flexible elements adapted to be secured to the second transverse arm and adapted to be attached to the front legs of the animal.

2. In apparatus of the character described, a body portion to receive the body of the animal thereon, a neck receiving device mounted upon the body portion and including a lower jaw, a transverse arm extending laterally beyond the lower jaw, upstanding pins secured to the transverse arm and arranged near and spaced from the lower jaw to provide passages for receiving the front legs of the animal, means to retain the front legs within the passages, and means for holding the animal to the body portion.

3. In apparatus of the character described, a body portion to receive the body of the animal thereon, a neck receiving device mounted upon the body portion and including a lower jaw, a transverse arm arranged adjacent to the body portion, upstanding pins carried by the transverse arm and spaced from the lower jaw to form leg receiving passages, flexible elements to engage the front legs of the animal and to hold them within the passages, means to retain the flexible elements in place, and means to hold the animal upon the body portion.

4. In apparatus of the character described, a body portion to receive thereon the body of the animal, a yoke mounted upon the body portion and adapted to receive the neck of the animal, a transverse arm arranged adjacent to the yoke and extending laterally beyond the same, holding elements mounted upon the transverse arm at points remote from the yoke, a second transverse arm disposed near the end of the body portion, flexible elements adapted to be attached to the second transverse arm and adapted for engaging the holding elements and adapted to be secured to the arms or front legs of the animal to hold them spread and stretched, and means adapted for holding the body of the animal upon the body portion.

5. In apparatus of the character described, a body portion to receive thereon the body of the animal, a transverse arm mounted upon the body portion, a neck receiving yoke mounted upon the transverse arm, the transverse arm extending laterally beyond the yoke, holding elements mounted upon the transverse arm at points remote from the yoke, flexible elements adapted to be secured to the arms or front legs of the animal and adapted for engaging the holding elements, and means to hold the flexible elements against longitudinal displacement, and means adapted to secure the body of the animal upon the body portion.

6. In apparatus of the character described, a body portion to receive thereon the body of the animal, a carriage mounted upon the body portion and adjustable longitudinally thereof, said carriage including a longitudinal arm and a transverse arm, a neck receiving yoke mounted upon the carriage, holding elements mounted upon the transverse arm at points remote from the yoke, a second transverse arm mounted upon the longitudinal arm and spaced from the first named transverse arm, flexible elements adapted to be secured to the arms or front legs of the animal and adapted for engaging the holding elements and secured to the second transverse arm, and means adapted for holding the body of the animal upon the body portion.

7. In apparatus of the character described, a body portion to receive thereon the body of the animal, a transverse arm mounted upon the body portion and extending laterally beyond the same, holding elements secured to the ends of the transverse arm, a second transverse arm spaced from the first transverse arm, flexible elements to be secured to the arms or front legs of the animal and engaging the holding elements and secured to the second arm, a third transverse arm arranged near the rear end of the body portion and extending laterally therebeyond, flexible elements to be secured to the rear legs of the animal and connected with the third transverse arm at points remote from the body portion, and means to retain the body of the animal in place upon the body portion.

8. In apparatus of the character described, a body portion to receive thereon the body of the animal, a longitudinal arm mounted upon the body portion to be adjusted longitudinally thereof and extending beyond the forward end of the body portion, a transverse arm carried by the longitudinal arm and extending laterally beyond the body portion, flexible elements to be secured to the front legs or arms of the animal and connected with the transverse arm at points remote from the body portion, a second longitudinal arm mounted upon the body portion and adjustable longitudinally thereof and extending beyond the rear end of the body portion, a transverse arm carried by the second longitudinal arm, and flexible elements to be secured to the rear legs of the animal and attached to the second transverse arm at points remote from the body portion, and means to retain the body of the animal in place upon the body portion.

9. In apparatus of the character described, a body portion to receive thereon the body of the animal, an arm extending longitudinally of the body portion and adjustable longitudinally thereof, means to hold the arm in the selected adjusted position, a transverse arm mounted upon the longitudinal arm and adjustable longitudinally of the longitudinal arm, means to hold the transverse arm in the selected adjusted position, flexible elements connected with the transverse arm for connection with the front legs or arms of the animal, a second longitudinal arm longitudinally adjustably mounted upon the body portion, means to hold the second longitudinal arm in the selected adjusted position, a transverse arm mounted upon the second longitudinal arm and adjustable longitudinally of the second longitudinal arm, means to hold the second transverse arm in the selected adjusted position, and flexible elements to be connected with the rear legs of the animals and secured to the second transverse arm.

10. In apparatus of the character described, a body portion to receive thereon the body of the animal, said body portion having edge recesses, filler-strips removably mounted within the recesses, and a neck receiving yoke mounted upon the body portion, said yoke including bolts removable downwardly through the edge recesses.

11. In apparatus of the character described, a body portion to receive thereon the body of the animal, a yoke mounted upon the body portion, said yoke comprising a lower jaw, upstanding rods engaging the lower jaw, an upper jaw slidably mounted upon the rods, spacing sleeves arranged between the jaws and carried by the rods, and nuts having screw-threaded engagement with the rods to force the upper jaw downwardly.

12. In apparatus of the character described, a body portion to receive thereon the body of an animal, said body portion having a longitudinal groove, an arm mounted to slide within the groove, a bridge attached to the body portion and extending over the groove, an element carried by the bridge to engage the longitudinal arm and hold it against movement, a transverse arm carried by the longitudinal arm, means to mount the transverse arm upon the longitudinal arm so that it can be shifted longitudinally of the longitudinal arm, the transverse arm being adapted for connection with flexible elements to be secured to the legs or arms of the animal.

13. In apparatus of the character described, a body portion to receive thereon the body of an animal, said body portion having a longitudinal groove, a stationary plate mounted within the groove and having screw-threaded openings and upstanding pins, a longitudinal arm to be adjustably mounted within the groove and having screw-threaded openings to register with the screw-threaded openings of the stationary plate and plain openings to receive the pins, a screw to engage within two of the registering openings, a transverse arm having a screw-threaded opening to register with a selected screw-threaded opening of the longitudinal arm and also having a pin for insertion within a selected plain opening of the longitudinal arm, a screw to engage within the last named registering openings, the transverse arm being adapted for connection with flexible elements to be secured to the legs of the animal.

ARDZROONY PACKCHANIAN.